United States Patent [19]

Urushibara et al.

[11] Patent Number: 5,112,271
[45] Date of Patent: May 12, 1992

[54] METHOD AND APPARATUS FOR GUTTING FISH

[75] Inventors: Seiichi Urushibara, Ninohe; Kuniya Yusa, Kitazawa, both of Japan

[73] Assignee: Taiyo Fishery Co., Ltd., Tokyo, Japan

[21] Appl. No.: 619,381

[22] Filed: Nov. 29, 1990

Related U.S. Application Data

[62] Division of Ser. No. 457,377, Dec. 27, 1989, Pat. No. 4,993,116.

[30] Foreign Application Priority Data

Mar. 1, 1989 [JP] Japan ................. 1-46481

[51] Int. Cl.⁵ ............................................. A22C 25/00
[52] U.S. Cl. ................................. 452/108; 452/110; 452/116
[58] Field of Search .............. 452/110, 106, 107, 108, 452/116, 121

[56] References Cited

U.S. PATENT DOCUMENTS

3,793,676  2/1974  Wiggins .................. 452/106
3,843,998  10/1974  Wenzel ................... 452/108

FOREIGN PATENT DOCUMENTS

69328  6/1945  Norway .
71714  2/1947  Norway .
134091  11/1970  Norway .

Primary Examiner—Willis Little
Attorney, Agent, or Firm—Fleit, Jacobson, Cohn, Price, Holman & Stern

[57] ABSTRACT

An apparatus for carrying out a method for gutting fish is provided, which comprises in combination a conveyor including a number of segments at given intervals in a direction substantially perpendicular with respect to its moving direction and operating at a given speed in a certain direction, a rotary cutter for cutting off a head of a fish placed and carried on the conveyor while the venter located within the segment leads and the head is projected from one side edge of the conveyor, a retainer for retaining the fish to be beheaded in place, a plate for forcing the dorsal region of the beheaded fish onto the conveyor by the action of a spring, a guide plate fixed at a position where it comes into engagement with a cut end of the beheaded fish forced onto the conveyor by the plate, and a guts squeezer member formed of an elastomer adpated to be forcedly slid over the venter of the fish from the anus toward the cut end, the fish being now in engagement with the fixed guide plate and forced by the plate.

3 Claims, 4 Drawing Sheets

METHOD AND APPARATUS FOR GUTTING FISH

This is a divisional of application Ser. No. 07/457,377, filed Dec. 27, 1989, now U.S. Pat. No. 4,993,116.

BACKGROUND OF THE INVENTION

1. Field of the Invention

The present invention relates to a method and apparatus for beheading and gutting fish such as Alaska pollacks, while they are kept straightforward, in a pretreating step which is to be carried out before they are processed into a material for ground fish meat

2. Prior Art

In order to process fish such as Alaska pollacks into a material for ground fish meat, they are first beheaded and gutted and then supplied to a unit 12 for removing bones such as spinal bones (hereinafter referred simply to as the deboner), as illustrated in FIG. 8 providing a schematic illustration of the deboner and FIGS. 9a, 9b and 9c being end views taken along the lines A—A, B—B and C—C of FIG. 8, respectively, where they are processed into a fish meat product ridded of main bones. Referring to the deboner 12, a beheated and gutted fish is carried on a belt 12a, while its both sides are firmly held with its ventral side down, to a venter cutter 12b with which the ventral sides is cut open (see FIG. 9a), then to first deboner rotary cutters 12c placed and driven on both sides of and below the belt 12a, with which the ribs are cut off (see FIG. 9b), and finally to second rotary deboner cutters 12d placed and driven on both side of and below the belt 12a, with which the spinal bone is cut off (see FIG. 9c). Thus, the fish has to be firmly held and delivered on the deboner 12 while the spinal bone is located in parallel with the delivery direction.

Heretofore, the removal of the guts from fish supplied to the deboner 12 has been manually carried out because, in the case of Alaska pollacks in particular, there is contained valuable "cod roes" adjacent to the guts. As disclosed in, for instance, Japanese Patent Publication No. 59-26257 entitled "Cod Roe Remover", however, there has recently been developed equipment in which the cod roe with the guts is squeezed out of the venter of a fish previously beheaded by mechanical means so as to cut down labor cost and reduce the processing time.

However, the following problem arises with such a cod roe remover. A fish is beheaded while firmly held and suspended at the rear region of the trunk and the tail region by a carrier unit comprising a carrier belt and a carrier chain, and the guts and cod roes are then squeezed out by applying pressure to the ventral region. Since this equipment is designed with a main view to obtaining cod roes rather than fish meat, some moment acts upon the firmly held region of the fish so that the fish yields, when the guts with cod roes are squeezed out of the fish by applying pressure to the ventral region. This means that when the fish yields in this manner, the fish may be unlikely to be firmly held on the above deboner 12 upon being supplied thereto. Even though the fish is successfully held on the deboner, such inconvenience as the spinal bone left in fish meat is encountered, since the spinal bone is not in parallel with the delivery direction of the fish. Required to restore a yielding fish to the original state is labor or considerably sophisticated equipment. As a result, it has been impossible to feed fish directly to processing steps for obtaining fish meat in the form of a material for ground fish meat.

Additionally, this defect implies that the above deboner 12 cannot be mounted contiguous to such a cod roe remover and, hence, there is needed room for correcting yielding fish in front of said deboner 12. However, grave difficulty is encountered in providing such room on a ship which is given only a relatively limited space for immediate treatments of catches of fish. This places some limitation upon throughputs, especially when fish are caught in big quantity.

SUMMARY OF THE INVENTION

An object of the present invention is to provide a method and apparatus for gutting fish, which is free from such disadvantages as mentioned above, and prevents the fish from yielding when the guts are squeezed out of them after beheading, whereby the beheaded and gutted fish can be immediately supplied to steps of processing them into a material for ground fish meat, thus resulting in increased throughputs.

As a result of intensive studies made to solve such problems with the conventional apparatus as mentioned above, the present inventors have found that since the carrier unit for moving fish to a position, where they are to be gutted, is designed to firmly hold only the rear region of the trunk or the tail region of a fish, a force counter to the delivery direction acts upon the venter of the fish when a guts squeezer member is forcedly slid thereover, so that some moment acts upon the fish firmly held around the rear region of the trunk or the tail region thereof, thus causing the fish to yield, and that the guts can be squeezed out of the fish while kept straightforward, if the fish is placed on a conveyor rather than suspended to cause the dorsal region of the fish to be forced onto the conveyor by a plate member and bring the dorsal side of a cut end of the fish, along which it has been beheaded, into engagement with a fixed guide plate, when a guts squeezer member is forcedly slid over the venter of the fish.

BRIEF DESCRIPTION OF THE DRAWINGS

The present invention will now be explained specifically but not exclusively with reference to the accompanying drawings, in which.

DETAILED DESCRIPTION

Figure 1:
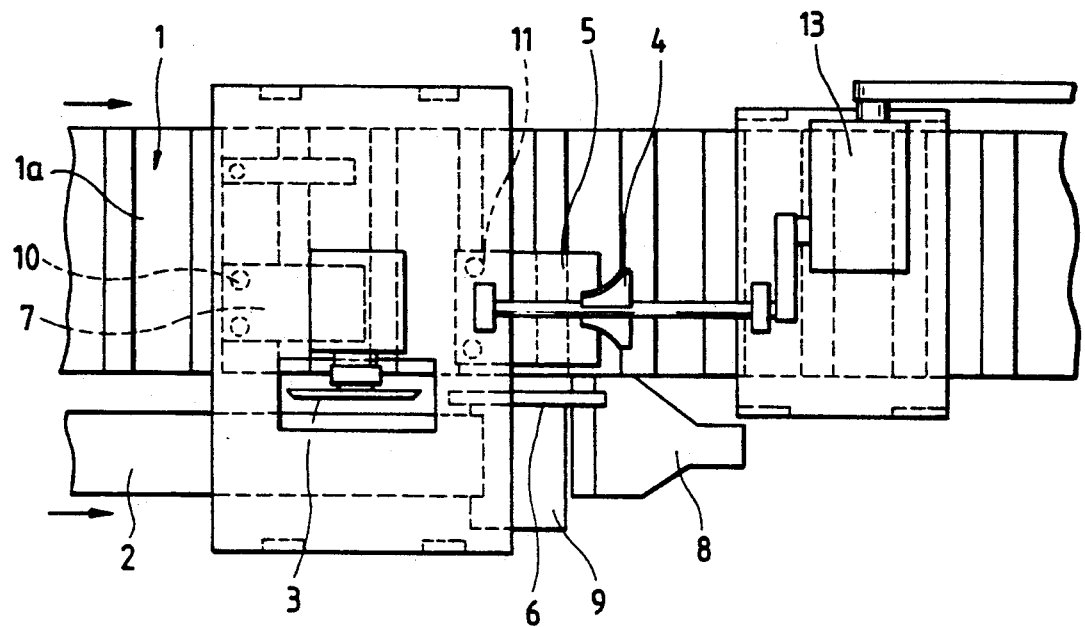
FIG. 1 is a plan view showing one embodiment of the apparatus for carrying out the method for gutting fish according to the present invention.
Figure 2:
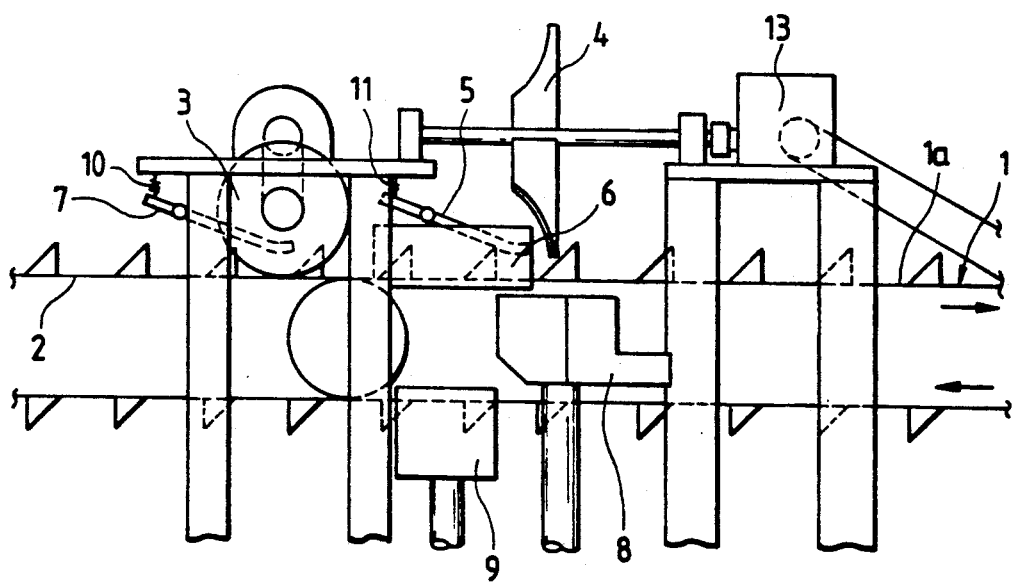
FIG. 2 is a front view of that embodiment.
Figure 3:
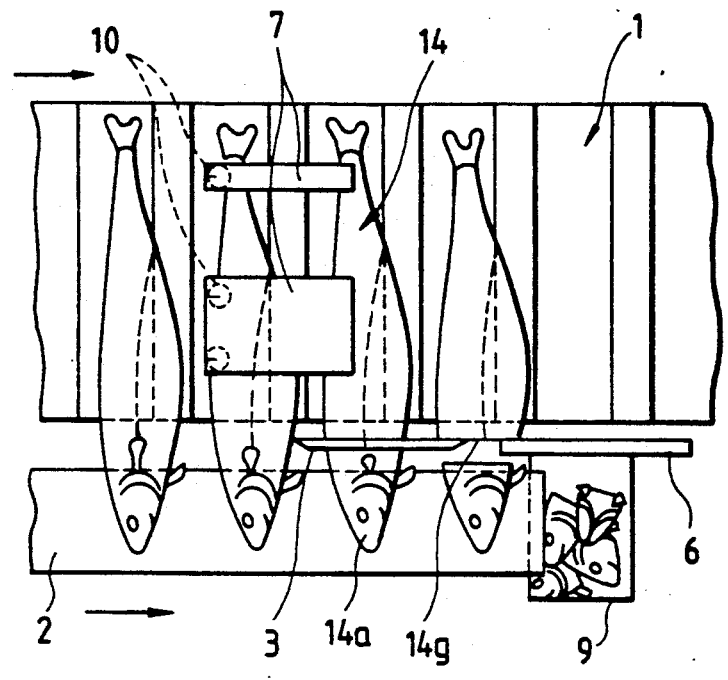
FIG. 3 is a plan view illustrating part of the apparatus of FIG. 1, in which fish is shown beheaded.
Figure 4:
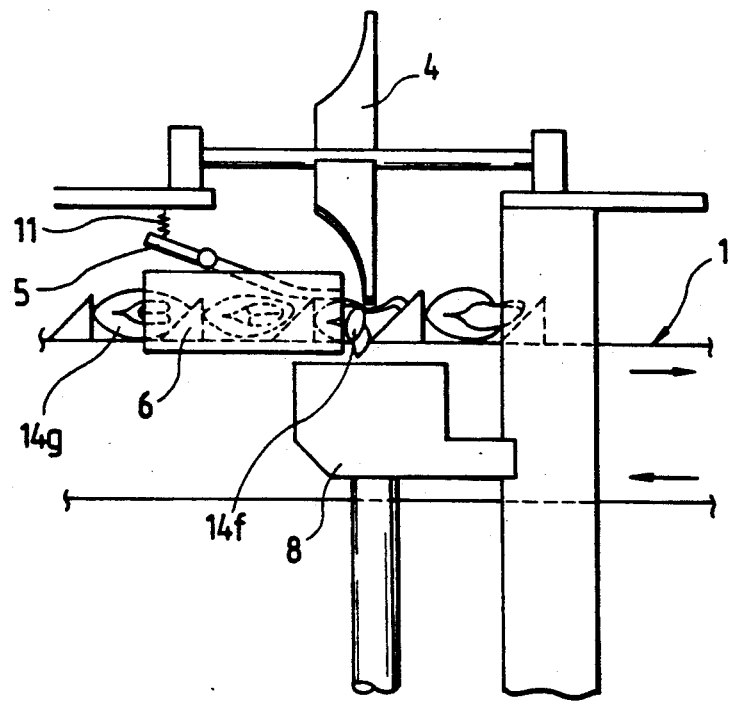
FIG. 4 is a front view of part of the apparatus of FIG. 2, in which a fish is shown gutted.
Figure 5A:
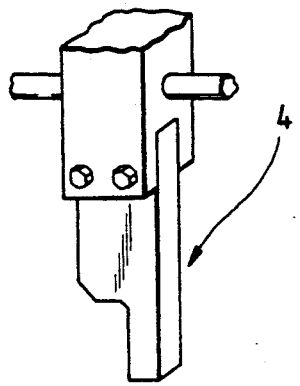
FIG. 5a and 5b are enlarged perspective views showing examples of the geometry of the elastomer forming the guts squeezer member.
Figure 5B:
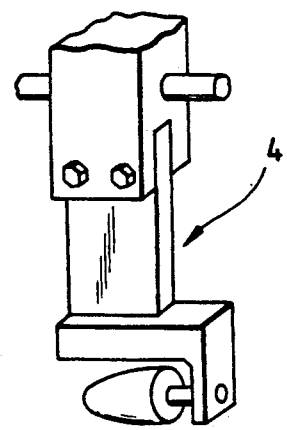
Figure 6:
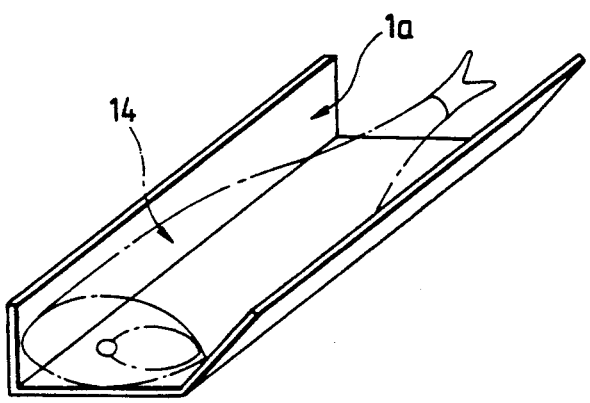
FIG. 6 is an enlarged perspective view showing one segment of the conveyor.
Figure 7:
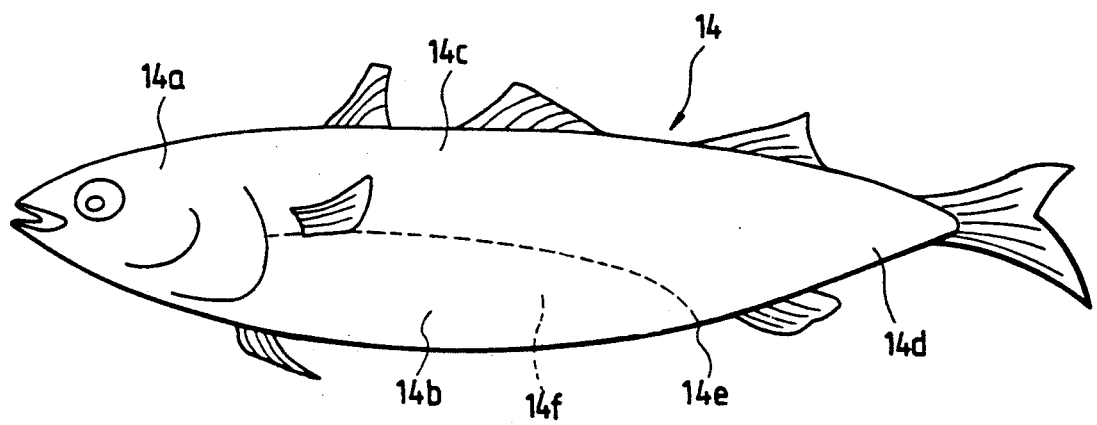
FIG. 7 is a front view illustrating the shape of a fish to be gutted.
Figure 8:
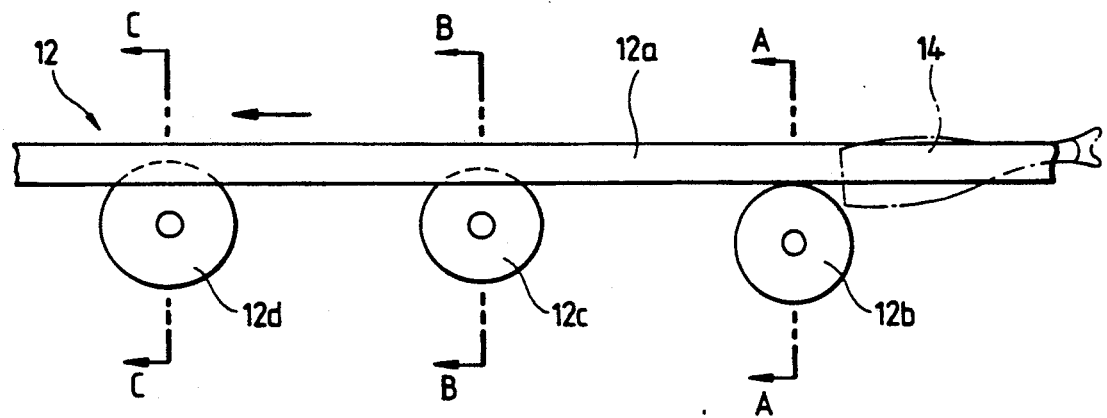
FIG. 8 is a schematical illustration of a conventional deboner.
Figure 9A:
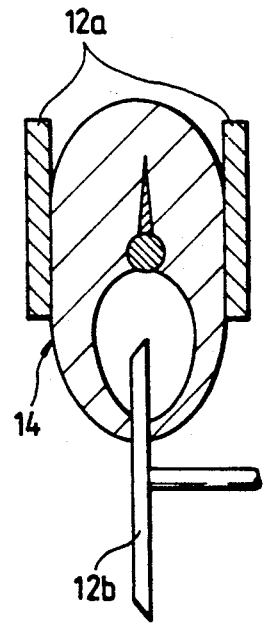
FIGS. 9a, 9b and 9c are end views taken along the lines A—A, B—B and C—C of FIG. 8, respectively.
Figure 9B:
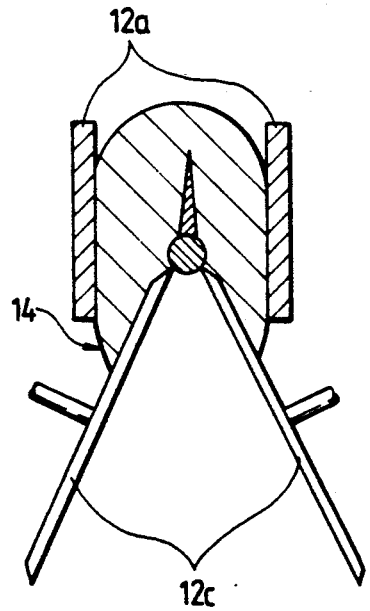
Figure 9C:
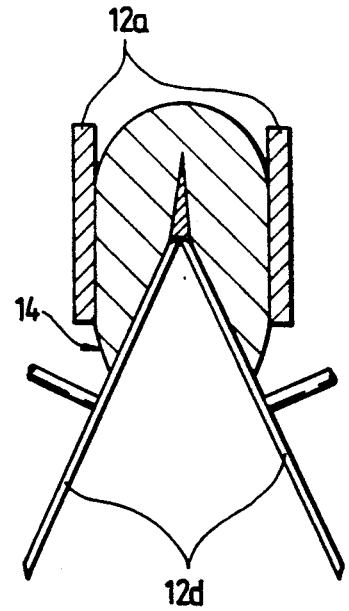

Referring to the drawings, especially, FIG. 1, a conveyor shown generally at 1 is designed to be driven at a constant speed in a certain direction and includes a number of segments 1a arranged at given intervals in a direction substantially perpendicular to the moving direction. It is preferable that each or the segment 1a is generally of such a U-shape in cross-section that a leading side wall is inclined upwardly, as illustrated in FIGS. 6 and 2, since the venter 14b of a fish 14 is then supported by the leading inner wall of the segment 1a so that it is constantly positioned in place within the conveyor 1 without being vertically displaced or turned. A trailing side wall of the segment 1a extends substantially vertically and perpendicular to the direction of movement of the conveyor 1, as shown in these figures, for engagement by the dorsal region 14c of the fish 14 during the squeezing operation, as shown in FIG. 4. A head carrying conveyor 2 is positioned on one side of the conveyor 1 and driven in parallel with the moving direction of the conveyor 1 and at the same speed as the speed of the conveyor 1 so as to place thereon the head 14a of the fish 14 which is supplied into the segment 1a of the conveyor 1, while the venter 14b is made to face the leading side wall of the segment 1a with the head 14a extending sideways. Preferably, the head carrying conveyor 2 is in operative association with a rotary shaft of the conveyor 1. It is understood that the head carrying conveyor 2 may be located at least between a position at which the fish 14 is supplied and a position at which the head 14a of the fish 14 is cut off. A rotary cutter 3 is driven at an end edge position of said conveyor 1 to cut off the head 14a of the fish 14. However, it is required to provide a retainer 7 for retaining the fish 14 in place so as to prevent it from displacement due to a force imparted by the cutter 3, when the head 14a of the fish 14 is cut off thereby. Since the retainer 7 need only be positioned on the conveyor 1, it is preferably of such a structure that the fish 14 is forced at the dorsal and tail regions 14c and 14d onto the conveyor 1 by a spring, as illustrated in FIG. 2 as an example. A guts squeezer member 4 in the form of a spatula or roller gives force to and is slid or moved over the venter 14b of the beheaded fish 14 from the anus 14e toward a cut end 14g along which the fish has been beheaded. The guts squeezer member 4 is formed of an elastomer having some strength such as rubber or synthetic resin, since it is at least required not to break the skin of the fish 14, when it gives force to and is slid over the venter 14b. This guts squeezer member 4 may be one fixed to a shaft rotatable in operative association with a driving shaft of the conveyor 1, as illustrated in FIGS. 1 and 2, or alternatively an elastomer fixed to, e.g., a belt or chain driven perpendicularly with respect to the moving direction of the conveyor 1. Still alternatively, it may be an elastomer fixed to, e.g., an air cylinder reciprocating perpendicularly with respect to the moving direction of the conveyor 1. A plate 5 is provided to force the dorsal region 14b of the beheaded fish 14 onto the conveyor 1 by a spring 11. A guide plate 6 is fixed at a position where it is to engage the cut end 14g of the fish 14 forced by the plate 5 for ensuring to prevent the fish 14 forced by the plate 5 from being pressed out of or falling from the conveyor 1, when said guts squeezer member 4 gives force to and is slid over the venter 14b of the fish 14. Thus, the guide plate 6 is fixedly provided at a position where it is to engage the dorsal side 14c of the cut end 14g of the fish 14, when the guts squeezer member 4 is forcedly slid over the venter 14b of the fish 14. A guts guide member 8 is provided to receive the guts 14f squeezed out by the forced sliding of the squeezer member 4 over the venter 14b of the beheaded fish 14 and guide them to a given position. A head guide member 9 is provided to receive the cut-off head 14a and guide it to a given position. A timing unit 13 is provided for concurrent forced sliding of a plurality of said guts squeezer members 4 over the venters 14b of the fish 14 being carried, and is designed to drive them in operable association with the operating speed of the conveyor 1.

Reference will now be made to the operations for carrying out the present method for gutting fish with the present apparatus for gutting fish.

The fish caught 14 is placed and carried on the conveyor 1 with the venter 14b opposite to the leading side wall of the segment 1a and the head 14a projecting from one side edge of the segment 1a. If the head carrying conveyor 2 is provided in place at that time, it is then possible to carry the fish 14 in a stable manner, since the head 14a of the fish 14 projecting from the side edge of the segment 1a is supported. Then, the fish 14 firmly held by the retainer 7 is beheaded by the cutter 3, and is further carried on the conveyor 1 to cause the guts squeezer 4 to be forcedly slid over the venter 14b, while it is forced onto the conveyor 1 by the plate 5. In that case, since the dorsal region 14c of the cut end 14g of the fish 14, along which it has been beheaded, comes into engagement with the fixed guide plate 6, it is unlikely that the fish 14 may be pressed out of or fall from the conveyor 1 in the direction along which the guts squeezer 4 is forcedly slid over the venter 14b. In addition, since the dorsal region 14c of the fish 14 is forced onto the conveyor 1 by the plate 5, it is possible to keep the fish 14 straightforward, although it tends to yield rearwardly, as viewed in the moving direction, while the guts squeezer 4 is forcedly slid over the venter 14b. Moreover, it is unlikely that the guts squeezer 4 may cause noticeable damage to the fish 14, since the forced sliding portion of the guts squeezer 4 is formed of an elastomer. The guts 14f thus squeezed out of the fish 14 include not only edibles such as the ovary and soft roes but also oils to be later extracted, and are easily processed because of the provision of the guts guide member 8.

The apparatus for gutting fishes, as detailed above, for carrying out the method for gutting fishes according to the present invention can be operated at speeds so high that throughputs can be increased, since the guts can be squeezed out of beheaded fish without their yielding and the adjacent fish can be arranged at a close interval. The present apparatus has also an economical advantage, since fish can be supplied to the deboner without correcting them, so that any man power therefor is not needed, thus resulting in labor cost being cut down.

Further, fish can be smoothly beheaded, because this is achieved while they are forced onto the conveyor by the plate member. Still further, the present apparatus neither has appreciable influence upon fish nor causes noticeable damage to the guts squeezed out of them, since it is designed such that the guts are removed from fish by causing the squeezer formed of an elastomer to be forcedly slid over their venters. Still further, where the guts and head guide members are provided, it is possible to make effective use of fish to the last piece, since the guts and heads removed can be utilized for edible and feed purposes. Thus, the present invention provides many advantages over conventional methods and apparatus and so is of great industrial value.

What is claimed is:

1. A method for gutting fish, which comprises the steps of:

feeding a fish onto a conveyor including a number of segments extending at given intervals substantially perpendicular to its moving direction and operating at a selected speed in a certain direction, with the venter of the fish leading and the head of the fish projected from one side edge of said conveyor, cutting off the head of said fish along said side edge of said conveyor by means of a cutter, causing a guts squeezer member to be forcedly moved over the venter of said fish from the anus toward the cut end at which said fish has been beheaded, while forcing the dorsal region of said fish onto said conveyor and also engaging the dorsal side of said cut end of said fish with a fixed guide plate, thereby squeezing the guts out of said fish.

2. A method for gutting fish as claimed in claim 1, wherein each segment of said conveyor is generally of a U-shape in cross-section with a leading side wall inclined upwardly, and which further comprises the step of engaging the venter of said fish with the inclined leading side wall during the squeezing of the venter.

3. A method for gutting fish as recited in claim 2, which further comprises the step of also engaging the dorsal region of said fish with a trailing side wall of the associated conveyor segment which extends substantially perpendicular to the path of conveyor movement during the squeezing operation.

* * * * *